Patented Oct. 26, 1948

2,452,505

UNITED STATES PATENT OFFICE 2,452,505

DEHYDROGENATING SATURATED NITRILES TO UNSATURATED NITRILES

John W. Teter, Chicago, Ill., assignor to Sinclair Refining Company, New York, N. Y., a corporation of Maine No Drawing. Application June 23, 1943, Serial No. 491,937

1 Claim. (Cl. 260—465.9)

This invention relates to the production of unsaturated organic compounds containing nitrogen and, more particularly, to the dehydrogenation of nitriles for production of unsaturated nitriles.

Unsaturated nitriles are required for the manufacture of numerous important synthetic products. For example, acrylonitrile is used in producing synthetic rubber. Unsaturated acids and esters, produced directly by hydrolysis or alcoholysis of unsaturated nitriles, are raw materials for numerous synthetic resins. Products readily obtained from these unsaturated nitriles are valuable for synthesis in the production of pharmaceuticals, surface coatings, dyes, rubber chemicals, explosives, and the like.

It is known that nitriles may be dehydrogenated with the production of unsaturated nitriles by contact with suitable catalysts at elevated temperatures. In general, however, dehydrogenation with catalysts used heretofore has been accompanied by cracking to such an extent as sometimes to completely dominate the dehydrogenation. Cracking during dehydrogenation results in production of carbon, volatile hydrocarbons, hydrogen cyanide and small amounts of ammonia, and represents a permanent loss of nitrile to the extent that the nitrile is thus consumed. Dehydrogenation with catalysts such as non-reducible metal oxides may be carried out in a commercially effective manner if cracking is controlled by careful attention to maintenance of rather specific reaction conditions of temperature, pressure and space velocity.

I have now discovered that a certain type of catalyst may be used for promoting the dehydrogenation reaction with such a negligible amount of cracking that in many instances no traces of carbon or of hydrogen cyanide are detectable.

The improvement of my present invention in the catalytic dehydrogenation of nitriles for production of unsaturated nitriles comprises the carrying out of the dehydrogenation in the presence of a catalyst comprising a metal sulfide. The catalyst is advantageously used in pelleted form, although the metal sulfides may be used effectively in other physical forms of varying degrees of subdivision.

As stated hereinbefore, I have found that metal sulfides are capable of promoting dehydrogenation of nitriles to unsaturated nitriles with a minimum amount of cracking. Molybdenum sulfide, in the form of either the disulfide or the trisulfide or both, tungsten sulfide, in the form of either the disulfide or the trisulfide or both, and nickel sulfide are illustrative of metal sulfides which may be used in accordance with the invention. Mixtures of metal sulfides may also be used with particular advantage.

The following table illustrates the use of two specific catalysts used in accordance with the invention. The specific reaction conditions set forth therein illustrate reaction conditions which may be used advantageously in accordance with the invention, although it must be understood that use of the metal sulfide catalysts is by no means limited to these specific conditions. The runs using these catalysts are compared in the table with operations using a non-reducible metal oxide catalyst. The non-reducible metal oxide catalyst employed in runs Nos. 1 and 2 (identified as catalyst "A") comprised 11.90% $Cr_2O_3$, 85.85% $Al_2O_3$, 2.20% $MgO$ and 2.25% $H_2O$. The sulfide catalyst used in run No. 3 and identified as catalyst "B" comprising a mixture of molybdenum sulfides containing 47.5% $MoS_2$ and 32.1% $MoS_3$, whereas the sulfide catalyst "C" used in run 4 was a mixture of a major proportion of tungsten sulfide and a minor proportion of nickel sulfide comprising 72.7% $WS_2$, 5.3% $WS_3$ and 11.3% $NiS$. In each instance a liquid propionitrile product comprising about 89% propionitrile, obtained by chilling crude propionitrile to about −65° F. and discarding the lower layer formed during chilling, was passed through a bed of the catalyst at the temperature and pressure indicated, the space velocity being expressed in terms of liquid volume of the nitrile charged per hour per volume of catalyst. The volume of the liquid product, collected at 0° C., was measured and compared with the volume of the propionitrile feed. Determination of the amount of acrylonitrile in the liquid product was carried out by diluting a sample of the liquid product with water, by adding the diluted sample to a potassium permanganate solution and heating the solution, then cooling the solution and subsequently adding sulfuric acid and potassium iodide, and by titrating the resulting liberated iodide with thiosulfate. The titration was standardized by comparison with synthetic samples containing known quantities of acrylonitrile and propionitrile in various proportions. Determinations of acrylonitrile by this procedure checked closely with determination of acrylonitrile by careful fractional distillation.

| Run No | 1 | 2 | 3 | 4 |
|---|---|---|---|---|
| Catalyst | A | A | B | C |
| Temp., °F | 1,210 | 1,220 | 1,220 | 1,210 |
| Pressure, Atmos | 1.0 | 0.13 | 1.0 | 1.0 |
| Space Velocity | 1.0 | 1.2 | 1.2 | 1.2 |
| Liquid Products: Total, Vol. percent on chg | 86.0 | 99.0 | 92.4 | 97.5 |
| Acrylonitrile: | | | | |
| Vol. percent in product | 21.5 | 11.0 | 18.0 | 15.0 |
| Mol percent of charge | 18.5 | 11.0 | 16.0 | 14.6 |
| HCN, mol percent of chg | 16.8 | 4.6 | | |
| Hydrogen, mol percent of chg | 31.5 | 11.9 | 15.0 | 13.6 |
| HCN: acrylonitrile | 0.91 | 0.42 | | |

Run No. 1, carried out with a non-reducible metal oxide catalyst at atmospheric pressure, produced acrylonitrile as well as a substantial amount of HCN, the latter indicating cracking taking place to appreciable extent. Run No. 2, carried out with the same catalyst at a subatmospheric pressure of 100 mm. of mercury so as to reduce the amount of cracking in accordance with my copending application Serial No. 491,936, filed concurrently herewith, now abandoned, gave a much lower ratio of cracking to dehydrogenation. On the other hand, runs Nos. 3 and 4, both carried out with metal sulfide catalysts at substantially the same temperature and pressure, produced somewhat less acrylonitrile than in run No. 1 and more than in run No. 2, but cracking was reduced to such an extent that hydrogen cyanide was not detectable in the reaction product and no observable amount of carbon was formed during the period of operation (1¾ hours for run No. 3 and 2 hours for run No. 4).

The catalysts of my invention are effective in the catalytic dehydrogenation of other nitriles and produce under a broad range of operating conditions effective yields of unsaturated nitriles with a minimum consumption of the nitriles due to cracking. The catalysts are adapted to dehydrogenate products containing a wide range of amounts of saturated nitriles and thus are effective in further dehydrogenating the product of a previous run through the catalyst. Continuous operation with recycle of unconverted saturated nitriles may be carried out with advantage with the metal sulfide catalysts.

The catalysts tend to lose their dehydrogenation activity after extensive use, due largely to accumulation of carbon on the catalyst as result of some cracking of the nitriles. The catalysts may be regenerated to their former activity by burning off the carbon in the presence of air, this operation converting the sulfides into their corresponding oxides. The oxides may in turn be converted back to the sulfides by bringing the oxides into contact with hydrogen sulfide, mercaptans, etc., at elevated temperatures of the order of about 1200° F.

I claim:

In the catalytic dehydrogenation of nitriles for the production of unsaturated nitriles, the improvement which comprises carrying out the dehydrogenation in the presence of a catalyst comprising a mixture of a major proportion of tungsten sulfide and a minor proportion of nickel sulfide.

JOHN W. TETER.

REFERENCES CITED

The following references are of record in the file of this patent:

UNITED STATES PATENTS

| Number | Name | Date |
|---|---|---|
| 2,110,833 | Mark et al. | Mar. 8, 1938 |
| 2,184,235 | Groll et al. | Dec. 19, 1939 |

FOREIGN PATENTS

| Number | Country | Date |
|---|---|---|
| 790,262 | France | Nov. 16, 1935 |